July 4, 1950

J. D. BENNETT 2,513,990

SPRING LOADED HYDRAULIC ADAPTER

Filed Aug. 25, 1947

INVENTOR.
JOHN D. BENNETT

BY

ATTORNEY

July 4, 1950 J. D. BENNETT 2,513,990
SPRING LOADED HYDRAULIC ADAPTER
Filed Aug. 25, 1947 3 Sheets-Sheet 2

INVENTOR.
JOHN D. BENNETT
BY
ATTORNEY

INVENTOR.
JOHN D. BENNETT
ATTORNEY

Patented July 4, 1950

2,513,990

UNITED STATES PATENT OFFICE 2,513,990

SPRING LOADED HYDRAULIC ADAPTER

John D. Bennett, Beaumont, Tex., assignor to International Derrick & Equipment Company, Columbus, Ohio, a corporation of Ohio Application August 25, 1947, Serial No. 770,541

15 Claims. (Cl. 294—82)

The invention concerns a spring loaded, hydraulic adapter for suspending elevator links, swivel hooks and the like from traveling blocks for use in rotary oil well drilling operations.

In my copending application, Serial No. 723,316, filed January 21, 1947, I have disclosed and claimed a traveling block, a spring loaded elevator link adapter and a spring loaded swivel hook which are combined to form a single unit which is relatively short from end to end and is adapted to occupy a minimum of space in the derrick. A single spring loaded adapter is provided, the adapter being designed to receive either a hook member or a clevis, as well as a pair of elevator links. A hook member is provided for use in connection with such adapter, the hook member being interchangeable with a clevis and having a shank portion adapted to be secured to the adapter by a pair of eyes formed integrally therewith.

The present invention concerns a modification of the apparatus described in my copending application.

It is an object of the invention to provide an improved spring loaded adapter of the character described.

It is a further object of the invention to provide a spring loaded adapter having hydraulic shock absorbing means incorporated therein.

The spring loaded adapter described in my copending application includes a precompressed compression spring which is adapted to support the weight of a stand of pipe (about three joints, for example) in the derrick before it is further compressed. Thus when the joints of pipe are being unscrewed the upper joints will be gradually lifted from the lower joints as the joints are unscrewed. This prevents damage to the pipe threads.

On occasions when it is desired to unscrew only one or two joints of pipe it may be found that the capacity of the compression spring is excessive. This may result in a jarring effect due to the action of the compression spring when it is suddenly relieved of the weight of the disconnected pipe, the capacity of the spring being more than enough to support the remaining one or two joints of pipe. It may also result in progressive stripping of the threads of the pipe, the capacity of the compression spring being sufficient to place an excessive strain on the final threads of the joints of pipe being unscrewed.

The jarring effect above mentioned may be sufficient to loosen the clasps of the elevators and cause the elevators to lose their grip on the pipe and permit the pipe to drop, thus creating a hazard to life and property.

The spring loaded adapter of the present invention includes hydraulic shock absorbing means designed to retard the action of the compression spring after the joints of pipe have been unscrewed and to thereby avoid the disadvantages above described, but without interfering with the normal effective action of the compression spring during the time that the joints of pipe are being unscrewed.

In lowering a string of pipe in the derrick the traveling block may be stopped abruptly, thus placing a severe strain on certain parts of the apparatus due to the weight and momentum of the pipe which is suspended therefrom. The spring loaded adapter includes a thrust bearing which would likely become damaged if it were subjected to the full effect of the shock resulting from sudden stopping of the traveling block. The hydraulic shock absorbing means is designed to avoid this possibility.

The invention will be understood from the following description and the accompanying drawing, in which.

Figure 1:
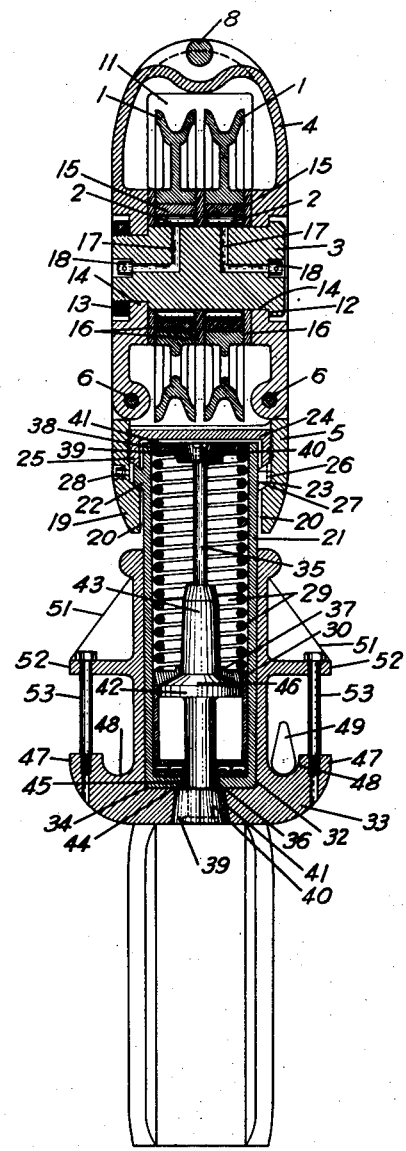
Fig. 1 is a view in elevation, partly in section taken on a median line, showing the combined traveling block, adapter and hook.
Figure 2:
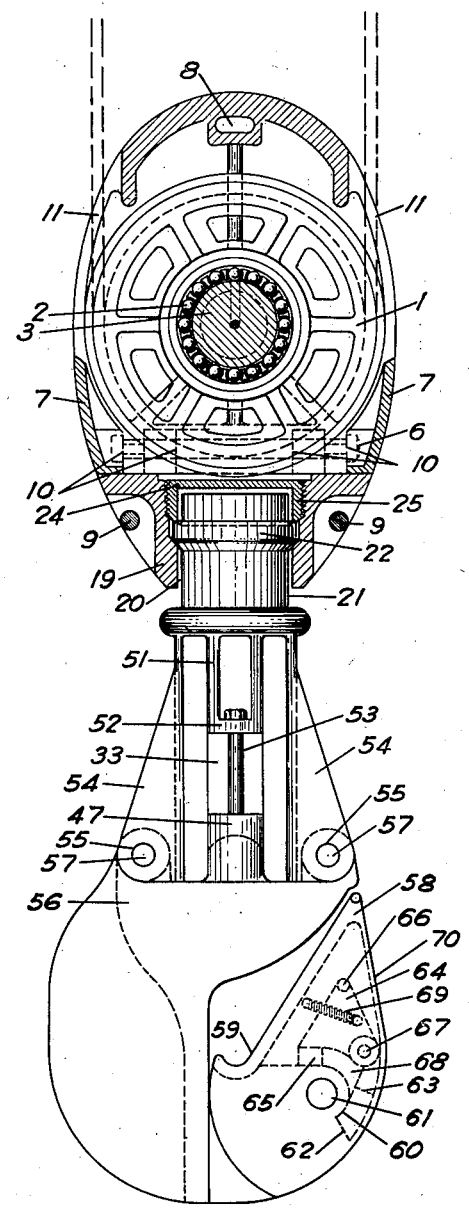
Fig. 2 is a view in elevation taken at right angles to the view shown in Fig. 1. The upper portion only of Fig. 2 is a sectional view taken on a median line.
Figure 3:
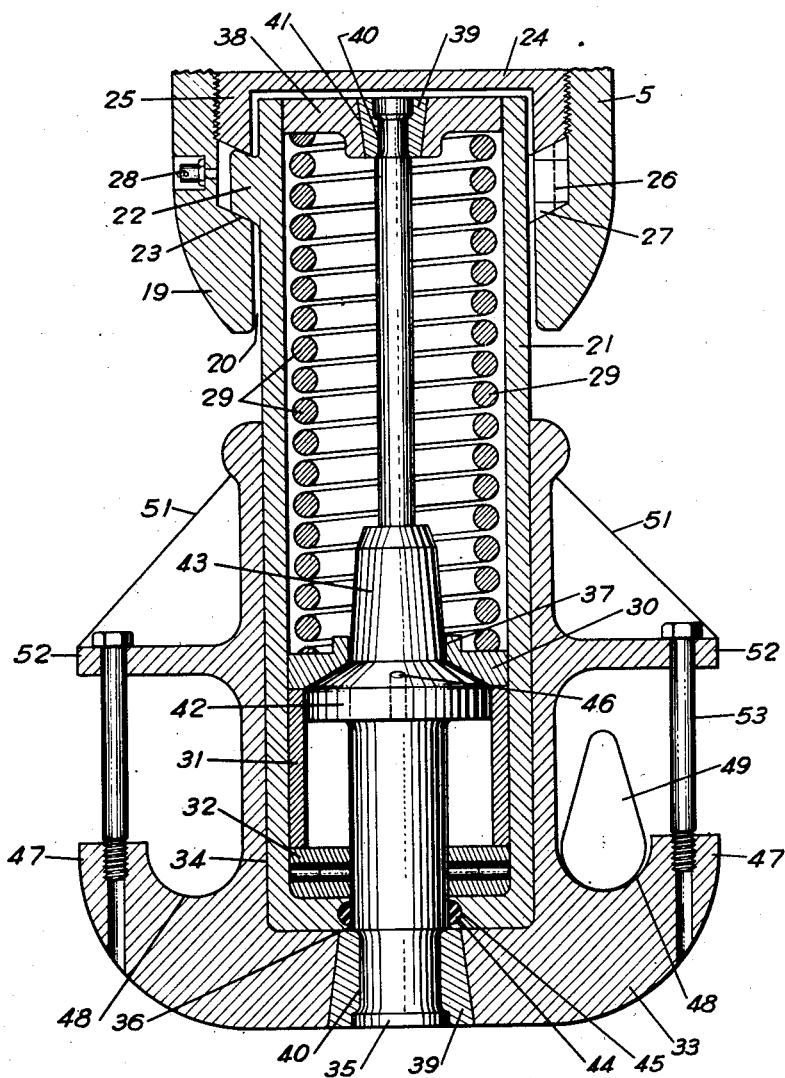
Fig. 3 is an enlarged fragmentary view showing a portion of the apparatus illustrated in Fig. 1.

Referring to the drawing, a pair of sheaves 1 are provided. The sheaves 1 have roller bearings 2 and are journaled on a trunnion 3. A housing 4 substantially encloses the sheaves 1 and provides end supports for the trunnion 3. The housing 4 is open at the bottom and is provided with a bottom closure member 5 adapted to be pivotally and removably secured to the housing 4 by bolts 6. A pair of removable end plates 7, adapted to be secured in place by the bolts 6, are provided. A ring 8 is formed in a recessed portion of the top wall of the housing 4 for use in suspending the traveling block from a wire rope. Pins 9, which are positioned in depressions formed in the ends of the closure member 5, are provided for use as handles.

The walls of the housing 4, the closure member 5 and the end plates 7 are formed with interlocking edges 10 which have aligned openings therein and are fastened together by the bolts 6. The arrangement is such that upon removing one of the bolts 6 the closure member 5 may be swung downwardly, the remaining bolt 6 acting as a hinge.

Openings 11 are provided in the end walls of the housing 4, above the tops of the end plates 7, to receive a wire rope, indicated by the dotted lines.

The trunnion 3 has a shoulder 12 at one end adapted to engage a side wall of the housing 4, and is threaded at the other end to receive a trunnion retaining member 13 which engages the opposite wall of the housing 4. The side walls of the housing 4 are provided with openings 14 adapted to receive the trunnion 3, and are depressed inwardly about the openings 14 so that the ends of the trunnion 3 are flush with the exterior surfaces of the housing 4.

The roller bearings 2 engage the trunnion 3 directly, race rings 15 being provided only between the bearings 2 and the sheaves 1. Spacing rings 16 are provided between the sheaves 1 and between the sheaves 1 and the side walls of the housing 4. Lubricating channels 17 and fittings 18 are provided in the trunnion 3 for lubricating the bearings 2 from the ends of the trunnion 3. The ends of the trunnion 3 are depressed to receive the lubricating fittings 18 so that they do not protrude.

The closure member 5 is formed with a downwardly depressed annular portion 19 having a central opening 20 in the bottom thereof. A cylindrical spring housing 21 having a shoulder 22 near the top thereof is partially enclosed by the annular portion 19, the lower end of the spring housing 21 extending downwardly thru the central opening 20. A bearing 23 positioned in the bottom of the annular portion 19 is adapted to engage the shoulder 22 of the spring housing 21 and a retaining member 24 secured in the annular portion 19 above the spring housing 21 has a downwardly extending annulus 25 adapted to engage the shoulder 22. The upper and lower surfaces of the shoulder 22 are respectively concave and convex, and the surfaces of the bearing 23 and the annulus 25 are respectively concave and convex, the arrangement being such that the spring housing 21 is capable of a limited pivotal movement. A tongue 26 projecting inwardly from the annular portion 19 and engaging a groove 27 in the shoulder 22 slidably secures the spring housing 21 against rotation with respect to the annular portion 19. A lubricating fitting 28 is provided in the wall of the annular portion 19 for lubricating the joint formed by the upper and lower surfaces of the shoulder 22, the bearing 23 and the annulus 25. The wall of the annular portion 19 is depressed to receive the lubricating fitting 28 so that it does not protrude.

A compression spring 29 is positioned in the spring housing 21. A spring seat 30, which is shaped generally like an inverted cup, is adapted to support the spring 29 from the bottom and has a downwardly extending annulus 31 adapted to engage a thrust bearing 32 positioned in the lower end of the spring housing 21.

An adapter member 33 is provided, the adapter member 33 having a cylindrical bore 34 adapted to receive the lower end of the spring housing 21 and being slidable and rotatable with respect thereto. A pin 35 is removably secured at its lower end to the adapter member 33 and extends upwardly thru a central opening 36 formed in the lower end of the spring housing 21 and a central opening 37 formed in the spring seat 30. A spring retaining member 38 is removably secured to the upper end of the pin 35 and is adapted to engage the top of the compression spring 29.

The pin 35 is secured at its ends to the adapter member 33 and the spring retaining member 38, respectively, by pairs of semi-circular wedges 39 which engage annular grooves 40 in the pin 35 and tapered circular openings 41 in the adapter member 33 and the spring retaining member 38.

The lower end of the pin 35 is of larger diameter than the upper end, the diameter of the enlarged portion being approximately the same as that of the opening 37 in the spring seat 30. A shoulder 42 is formed on the enlarged portion of the pin 35, and the pin 35 is adapted to be inserted thru the opening 37 in the spring seat 30 with the shoulder 42 positioned below the spring seat 30. The arrangement is such that the pin 35 is capable of a reciprocating movement as actuated by weight applied to the adapter member 33 and in response to the action of the compression spring 29. The under side of the shoulder 42 is flat and is adapted to engage the thrust bearing 32 when the spring 29 is fully compressed. The upper surface of the shoulder 42 is tapered and is adapted to engage the under side of the spring seat 30, which likewise is tapered, when the pin 35 is in its uppermost position. The enlarged portion of the pin 35 extends upwardly above the shoulder 42 for a distance which is approximately equal to the distance that the pin 35 travels vertically during the reciprocating movement thereof. The upper end of the enlarged portion, indicated by the numeral 43, is tapered.

The adapter member 33 is yieldably and rotatably supported with respect to the spring housing 21. The compression spring 29 is precompressed and is adapted to support the weight of a stand of pipe (about three joints, for example) in the derrick before it is further compressed. Thus when the joints of pipe are being unscrewed the upper joints will be gradually lifted from the lower joints as the joints are unscrewed. This prevents damage to the pipe threads.

The spring housing 21 is adapted to be completely filled with a hydraulic fluid such as cup grease, for example. A resilient sealing ring 44 is adapted to be inserted inn a circular groove 45 formed in the opening 36 and to engage the pin 35 to prevent the escape of the hydraulic fluid from the spring housing 21. One or more vertical channels 46 may be formed in the shoulder 42 to permit the hydraulic fluid to flow past the shoulder 42, the latter acting as a plunger during the reciprocating movement of the pin 35.

The presence of the hydraulic fluid in the spring housing 21, acting on the shoulder 42, tends to retard the movement of the pin 35 in either direction and to absorb shock. Thus the shoulder 42 is prevented from suddenly striking either the spring seat 30 or the thrust bearing 32. This cushioning effect may not be needed during the time that the pipe is actually being unscrewed. The tapered portion 43 of the pin 35 affords maximum clearance between the pin 35 and the opening 37, and permits the hydraulic fluid to flow freely thru the opening 37 at the beginning of the upward movement of the pin 35. Thus the pin 35 may be lifted rapidly at the beginning of its upward movement, as actuated by the compression spring 29, the pin 35 gradually coming to a stop as the flow of hydraulic fluid thru the opening 37 is restricted by the increasing diameter of the pin 35.

A pair of lugs 47 positioned on opposite sides of the adapter member 33 have notches 48 formed therein adapted to receive a pair of elevator links, one of which is indicated at 49. A second pair of lugs are positioned directly above the lugs 47. Each of the last mentioned lugs consists of a pair of longitudinal ribs 51 joined at their lower ends by a transverse portion 52. Screws 53 inserted thru openings in the transverse portions 52 engage the lugs 47 and are adapted to retain the elevator links 49 in the spaces between the upper and lower lugs.

Two pairs of longitudinal ribs 54 are positioned on opposite sides of the adapter member 33 and extend laterally from the adapter member 33 at right angles to the lugs 47. Each pair of ribs 54 is adapted to receive between them one of a pair of eyes, such as the eyes 55 of a hook member or the eyes of a clevis (not shown). A hook member is provided, the hook member having a shank portion 56 adapted to be secured to the adapter member 33 by the eyes 55, which are formed integrally therewith. Bolts 57 are inserted thru openings in the ribs 54 and the eyes 55 of the hook member.

As shown by the dotted lines, the back of the hook member is shaped generally like a saddle, being curved inwardly and adapted to engage a pipe, the pipe acting as a guide for aligning the elevators for ease of engagement of the elevators to the pipe.

The forward end of the hook member is provided with a locking arm 58 which is adapted to extend outwardly to receive a swivel bail or the like, and when in closed position is adapted to support the swivel bail in a notch 59 formed in the lower end thereof. The locking arm 58 is shaped generally like a saddle and is adapted to fit over a snout 60 which constitutes the forward end of the hook member. The locking arm 58 is pivotally secured intermediate its ends to the snout 60 by a pin 61. A shoulder 62 on the lower side of the snout 60 engages the body of the locking arm 58 at 63 and supports the locking arm 58 in open position. A latching member, which is formed by a pair of triangular pieces 64 connected by a cross piece 65 and a pin 66, is pivotally secured within the locking arm 58 by a pin 67, and the cross piece 65 is adapted to engage a lug 68 formed on the end of the snout 60, which is straddled by the latching member, when the locking arm 58 is in closed position. The cross piece 65 is retained in engagement with the lug 68 by a spring 69, and may be disengaged by inserting a hook thru an opening 70 in the body of the locking arm 58 and contacting the pin 66.

The invention may be modified in various ways without departing from the spirit and scope thereof.

I claim:

1. A spring loaded, hydraulic adapter for suspending elevator links, swivel hooks and the like from traveling blocks comprising a cylindrical spring housing, a compression spring receivable in the spring housing, an adapter member having a cylindrical bore adapted to receive the lower end of the spring housing and being slidable and rotatable with respect thereto, a pin secured at its lower end to the adapter member and extending thru a central opening formed in the lower end of the spring housing, the pin being yieldably supported by the compression spring and the arrangement being such that the pin is capable of a reciprocating movement as actuated by weight applied to the adapter member and in response to the action of the compression spring, a shoulder being formed on the pin intermediate its ends and the spring housing being adapted to be filled with hydraulic fluid, the shoulder acting as a plunger during the reciprocating movement of the pin and the arrangement being such that the hydraulic fluid, acting on the shoulder, tends to retard the movement of the pin in either direction and to absorb shock.

2. A spring loaded, hydraulic adapter for suspending elevator links, swivel hooks and the like from traveling blocks comprising a cylindrical spring housing, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and below the spring seat, the under side of the shoulder being adapted to engage the thrust bearing when the spring is fully compressed, the spring housing being adapted to be filled with a hydraulic fluid.

3. A spring loaded, hydraulic adapter for suspending elevator links, swivel hooks and the like from traveling blocks comprising a cylindrical spring housing, means for suspending the upper end of the spring housing from a traveling block, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and below the spring seat, the under side of the shoulder being adapted to engage the thrust bearing when the spring is fully compressed, the spring housing being adapted to be filled with a hydraulic fluid.

4. A spring loaded, hydraulic adapter for suspending elevator links, swivel hooks and the like from traveling blocks comprising a cylindrical spring housing, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pair of link receiving means positioned on opposite sides of the adapter member, a pair of eye receiving means positioned on opposite sides of the adapter member and extending laterally therefrom at right angles to the link receiving means, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and below the spring seat, the under side of the shoulder being adapted to engage the thrust bearing when the spring is fully compressed, the spring housing being adapted to be filled with a hydraulic fluid.

5. A spring loaded, hydraulic adapter for suspending elevator links, swivel hooks and the like from traveling blocks comprising a cylindrical spring housing, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and the pin being adapted to be inserted thru the opening in the spring seat with the shoulder positioned below the spring seat, the under side of the shoulder being adapted to engage the thrust bearing when the spring is fully compressed, the spring housing being adapted to be filled with a hydraulic fluid.

6. A spring loaded, hydraulic adapter for suspending elevator links, swivel hooks and the like from traveling blocks comprising a cylindrical spring housing, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed, the spring housing being adapted to be filled with a hydraulic fluid.

7. A spring loaded, hydraulic adapter for suspending elevator links, swivel hooks and the like from traveling blocks comprising a cylindrical spring housing, a compression spring receivable in the spring housing, a spring seat adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the spring housing being adapted to be filled with a hydraulic fluid.

8. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, a shoulder being formed on the pin above its lower end and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the spring housing being adapted to be filled with a hydraulic fluid.

9. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and exending upwardly thru central openings formed in the lower end of the spring housing and in the spring seat, a spring retaining member secured to the upper end of the pin and adapted to engage the top of the compression spring, a shoulder being formed on the pin above its lower end and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the spring housing being adapted to be filled with a hydraulic fluid, the shoulder acting as a plunger during the reciprocating movement of the pin and the arrangement being such that the hydraulic fluid, acting on the shoulder, tends to retard the movement of the pin in either direction and to absorb shock.

10. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the enlarged portion of the pin extending upwardly above the shoulder for a distance which is approximately equal to the distance that the pin travels vertically during the reciprocating movement thereof, the spring housing being adapted to be filled with a hydraulic fluid, the shoulder acting as a plunger during the reciprocating movement of the pin and the arrangement being such that the hydraulic fluid, acting on the shoulder, tends to retard the movement of the pin in either direction and to absorb shock.

11. A spring loaded, hydraulic adapter for suspending elevator links, swivel hooks and the like from traveling blocks comprising a cylindrical spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the enlarged portion of the pin extending upwardly above the shoulder for a distance which is approximately equal to the distance that the pin travels vertically during the reciprocating movement thereof, the spring housing being adapted to be filled with a hydraulic fluid, the shoulder acting as a plunger during the reciprocating movement of the pin and the arrangement being such that the hydraulic fluid, acting on the shoulder, tends to retard the movement of the pin in either direction and to absorb shock, the upper end of the enlarged portion being shaped to control the clearance between the pin and the opening in the spring seat and to regulate the flow of hydraulic fluid thru the opening as the pin is advanced thru the opening, the arrangement being such that the pin may be lifted at different speeds at different stages during its upward movement, as actuated by the compression spring, the speed of the pin during each stage of its upward movement being determined by the flow of hydraulic fluid thru the opening in the spring seat.

12. A spring loaded, hydraulic adapter for suspending elevator links, swivel hooks and the like from traveling blocks comprising a cylindrical spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being adapted to engage the thrust bearing when the spring is fully compressed and the upper surface of the shoulder being adapted to engage the under side of the spring seat when the pin is in its uppermost position, the enlarged portion of the pin extending upwardly above the shoulder for a distance which is approximately equal to the distance that the pin travels vertically during the reciprocating movement thereof, the upper end of the enlarged portion being tapered, the spring housing being adapted to be filled with a hydraulic fluid, the shoulder acting as a plunger during the reciprocating movement of the pin and the arrangement being such that the hydraulic fluid, acting on the shoulder, tends to retard the movement of the pin in either direction and to absorb shock, the tapered portion of the pin affording maximum clearance between the pin and the opening in the spring seat and permitting the hydraulic fluid to flow freely through the opening in the spring seat at the beginning of the upward movement of the pin and the arrangement being such that the pin may be lifted rapidly at the beginning of its upward movement, as actuated by the compresion spring, the pin gradually coming to a stop as the flow of hydraulic fluid thru the opening is restricted by the increasing diameter of the pin.

13. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being flat and adapted to engage the thrust bearing when the spring is fully compressed, the under side of the spring seat and the upper surface of the shoulder being tapered and the upper surface of the shoulder being adapted to engage the under side of the spring seat when the pin is in its uppermost position, the enlarged portion of the pin extending upwardly above the shoulder for a distance which is approximately equal to the distance that the pin travels vertically during the reciprocating movement thereof, the upper end of the enlarged portion being tapered, the spring housing being adapted to be filled with a hydraulic fluid, the shoulder acting as a plunger during the reciprocating movement of the pin and the arrangement being such that the hydraulic fluid, acting on the shoulder, tends to retard the movement of the pin in either direction and to absorb shock, the tapered portion of the pin affording maximum clearance between the pin and the opening in the spring seat and permitting the hydraulic fluid to flow freely thru the opening in the spring seat at the beginning of the upward movement of the pin and the arrangement being such that the pin may be lifted rapidly at the beginning of its upward movement, as actuated by the compression spring, the pin gradually coming to a stop as the flow of hydraulic fluid thru the opening is restricted by the increasing diameter of the pin.

14. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being flat and adapted to engage the thrust bearing when the spring is fully compressed, the under side of the spring seat and the upper surface of the shoulder being tapered and the upper surface of the shoulder being adapted to engage the under side of the spring seat when the pin is in its uppermost position, the enlarged portion of the pin extending upwardly above the shoulder for a distance which is approximately equal to the distance that the pin travels vertically during the reciprocating movement thereof, the upper end of the enlarged portion being tapered, the spring housing being adapted to be filled with a hydraulic fluid, vertical channels being formed in the shoulder to permit the hydraulic fluid to flow past the shoulder, the latter acting as a plunger during the reciprocating movement of the pin and the arrangement being such that the hydraulic fluid, acting on the shoulder, tends to retard the movement of the pin in either direction and to absorb shock, the tapered portion of the pin affording maximum clearance between the pin and the opening in the spring seat and permitting the hydraulic fluid to flow freely thru the opening in the spring seat at the beginning of the upward movement of the pin and the arrangement being such that the pin may be lifted rapidly at the beginning of its upward movement, as actuated by the compression spring, the pin gradually coming to a stop as the flow of hydraulic fluid thru the opening is restricted by the increasing diameter of the pin.

15. A spring loaded, hydraulic adapter for suspending elevator links, swivel hooks and the like from traveling blocks comprising a cylindrical spring housing, a compression spring receivable in the spring housing, a spring seat shaped generally like an inverted cup adapted to support the spring from the bottom and having a downwardly extending annulus adapted to engage a thrust bearing, a thrust bearing positioned in the lower end of the spring housing, an adapter member having a cylindrical bore adapted to receive the lower end of the spring housing and being slidable and rotatable with respect thereto, a pin secured at its lower end to the adapter member and extending upwardly thru central openings formed in the lower end of the spring housing and in the spring seat, a spring retaining member secured to the upper end of the pin and adapted to engage the top of the compression spring, the lower end of the pin being of larger diameter than the upper end and of approximately the same diameter as the opening in the spring seat, a shoulder being formed on the enlarged portion of the pin and the pin being adapted to be inserted thru the opening in the spring seat with the shoulder positioned below the spring seat, the arrangement being such that the pin is capable of a reciprocating movement as actuated by weight applied to the adapter member and in response to the action of the compression spring, the under side of the shoulder being flat and adapted to engage the thrust bearing when the spring is fully compressed, the under side of the spring seat and the upper surface of the shoulder being tapered and the upper surface of the shoulder being adapted to engage the under side of the spring seat when the pin is in its uppermost position, the enlarged portion of the pin extending upwardly for a distance which is approximately equal to the distance that the pin travels vertically during the reciprocating movement thereof, the upper end of the enlarged portion being tapered, the spring housing being adapted to be filled with a hydraulic fluid, a resilient sealing ring adapted to be inserted in a circular groove formed in the opening in the lower end of the spring housing and to engage the pin to prevent the escape of the sydraulic fluid from the spring housing, vertical channels being formed in the shoulder to permit the hydraulic fluid to flow past the shoulder, the latter acting as a plunger during the reciprocating movement of the pin and the arrangement being such that the hydraulic fluid, acting on the shoulder, tends to retard the movement of the pin in either direction and to absorb shock, the tapered portion of the pin affording maximum clearance between the pin and the opening in the spring seat and permitting the hydraulic fluid to flow freely thru the opening in the spring seat at the beginning of the upward movement of the pin and the arrangement being such that the pin may be lifted rapidly at the beginning of its upward movement, as actuated by the compression spring, the pin gradually coming to a stop as the flow of hydraulic fluid thru the opening is restricted by the increasing diameter of the pin.

JOHN D. BENNETT.

REFERENCES CITED

The following references are of record in the file of this patent:

UNITED STATES PATENTS

| Number | Name | Date |
|---|---|---|
| 1,638,213 | Reschke | Aug. 9, 1927 |
| 1,725,902 | Driscoll | Aug. 27, 1929 |